United States Patent [19]

Srebnik et al.

[11] Patent Number: 5,665,834

[45] Date of Patent: Sep. 9, 1997

[54] METHOD OF POLYMERIZING ALPHA-OLEFINS WITH BORYL ZIRCONOCENE ORGANIC 1,1-DIMETALLIC COMPOUND CATALYSTS

[75] Inventors: Morris Srebnik, Sylvania; Bin Zheng; Laurent Deloux, both of Toledo, all of Ohio

[73] Assignee: The University of Toledo, Toledo, Ohio

[21] Appl. No.: 558,251

[22] Filed: Nov. 17, 1995

Related U.S. Application Data

[63] Continuation of Ser. No. 262,790, Jun. 20, 1994, abandoned.
[51] Int. Cl.$^6$ ............................................. C08F 4/64
[52] U.S. Cl. ........................... 526/134; 556/7; 502/152; 526/346; 526/335; 526/352; 526/351; 526/348.6; 526/348.2
[58] Field of Search ............................ 526/134; 556/7; 502/152

[56] References Cited

PUBLICATIONS

E. Skrzypczak–Jankum et al. J Chem Soc Chem Commun. (1994) 127–128.
G. Erker et al. (1991) J Am Chem Soc 113, 7594–7602.
Hawley's Condensed Chemical Dictionary, 11th Ed, p. 854 Van Norstrand Reinhold, New York, 1987.

*Primary Examiner*—Mark Nagumo
*Attorney, Agent, or Firm*—Brinks Hofer Gilson & Lione

[57] ABSTRACT

Boron-zirconium 1,1,-dimetallic organic compounds useful in organic synthesis such as the preparation of alpha-borobromanes. The boron-zirconium compounds include boron and zirconiun, and in particular the synthesis, structure and reactivity of E-chlorobis(cyclopentadienyl)- [1-(4, 4,5,5-tetramethyl-1,3,2-dioxaborolane-2-yl)-3,3-dimethylbutenyl]zirconium (IV). The boron-zirconium 1,1-dimetallic compound is used as a polymerization catalyst to polymerize alpha-olefins such as styrene.

13 Claims, No Drawings

METHOD OF POLYMERIZING ALPHA-OLEFINS WITH BORYL ZIRCONOCENE ORGANIC 1,1-DIMETALLIC COMPOUND CATALYSTS

This application is a continuation of application Ser. No. 08/262,790, filed Jun. 20, 1994 now abandoned.

The present invention relates to boryl zirconocene dimetallic compounds as catalysts, the compounds including methods of polymerizing alpha olefin with chlorobis(cyclopentadienyl) [1-(1,3,2-dioxaborinane-2-yl)hexyl] zirconium (IV).

BACKGROUND OF THE INVENTION

It is desirable to use new methods of polymerizing alpha-olefins with new classes of Lewis acids to catalyze the polymerization. New Lewis acid type catalyst would be valuable for the stereo- or regio-selective polymerizations of olefins.

There has been growing interest in the synthesis or organozirconium compounds owing to recent reports of their applications in bond-breaking reactions, insertion reactions, conjugate additions, and Grignard-type additions.

1,1-Bimetallics of transition metals are well-known to serve a wide range of applications towards organic synthesis. However, the chemistry of 1,1-bimetallics containing zirconium has not been extensively studied, and only a few cases have been reported, including zirconium with zinc as well as aluminum. The examples of the use of boron in organic synthesis are legion. In order to extend organozirconiumboron chemistry, it would be of great value to develop a novel class of 1,1-bimetallics based on zirconium and boron. Since both zirconium and boron are lewis acids, it is reasonable to expect that zirconium and boron bimetallics could be potentially applied in organic synthesis as stoichiometric reagents.

Thus, hydrozirconation is one of the most promising organometallic techniques used in organic synthesis. Schwartz and co-workers have developed this reaction in a series of papers as follows:

1. Schwartz, J.; Hart, D. W. *J. Am. Chem. Soc.* 1974, 96, 8115.
2. Schwartz, J.; Labinger, J. A. *Angew. Chem. Int. Ed. Engl.* 1976, 15, 333.
3. Hart, D. W.; Blackburn, T. F.; Schwartz, J. *J. Am. Chem. Soc.* 1975, 97, 680.
4. Bertelo, C. A.; Schwartz, J. *J. Am. Chem. Soc.* 1976, 98, 262.
5. Carr, D. B.; Schwartz, J. *J. Am. Chem. Soc.* 1979, 101, 3521.

It would be desirable to provide new bimetallic compounds catalysts, the catalysts providing methods of polymerizing alpha-olefin containing Zr and B that provide superior and efficient methods.

OBJECTS OF THE INVENTION

It is an object of the present invention to provide method of polymerizing alpha-olefins using an organic bimetallic compound containing Zr and B in which Cp is bis(cyclopentadienyl), the compound having the following structure:

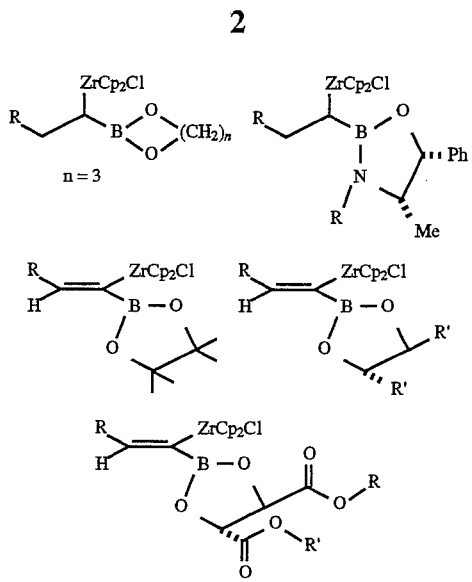

where R is an organic radical having 2 to 20 carbon atoms that is aliphatic, aromatic, heteroaromatic, or cyclic, or their halogenated substituted derivatives; and where $R^1$ is an alkyl group of 1 to 8 carbon atoms.

It is an object of the present invention to provide a method of polymerizing alpha-olefins with a Lewis acid type catalyst comprising 1,1-bimetallic compound having the following formula:

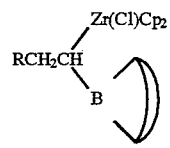

where R is an alkyl, except tert-butyl, alkenyl, cycloalkyl, phenyl, alkylphenyl and their chloro- or bromo-substituted derivatives; where

is B-borabicyclo[3.3.1]nonyl, and where $Cp_2$ is bis(cyclopentadienyl).

It is an object of the present invention to provide a method of polymerizing alpha-olefins with an optically inactive catalyst compound having the structure:

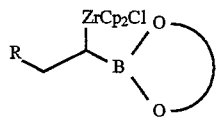

It is an object of the present invention to provide a method of polymerizing alpha-olefins using a catalyst that is an optically active compound having the structure:

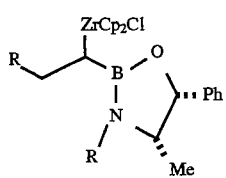

These and other objects will be apparent from the specification and the appended claims.

SUMMARY OF THE INVENTION

The present invention provides a method of polymerizing alpha-olefins with a catalyst that is an organic bimetallic compound containing Zr and B in which $Cp_2$ is bis(cyclopentadienyl), the compound having the following structure:

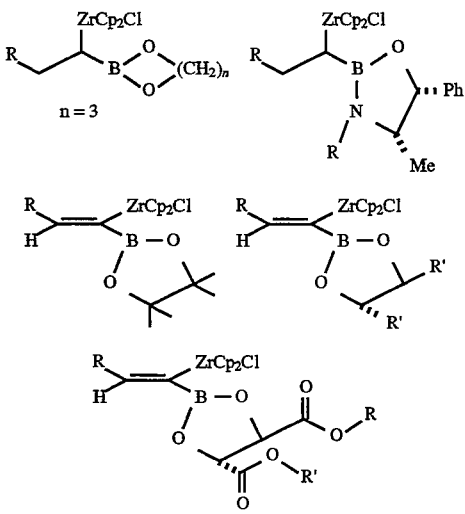

where R is an organic radical having 2 to 20 carbon atoms that is aliphatic, aromatic, heteroaromatic, or cyclic, or their halogenated substituted derivatives; and where R' is an alkyl group of 1 to 8 carbon atoms.

The present invention also provides a 1,1-bimetallic compound catalyst having the following formula:

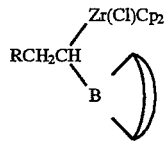

where R is an alkyl, except tert-butyl, alkenyl, cycloalkyl, phenyl, alkylphenyl and their chloro- or bromo-substituted derivatives; where

is B-borabicyclo[3.3.1]nonyl, and where $Cp_2$, is bis(cyclopentadienyl).

DETAILED DESCRIPTION OF THE INVENTION

The 1,1-dimetallic compounds catalysts (containing Zr and B) of the present invention are useful in polymerizing alpha-olefins.

The following example illustrates the preparation of the boron-zirconium 1,1-bimetallic compounds catalysts of the invention.

EXAMPLE 1

It has been found that hydrozirconation of various B-alkenyl borabicyclo[3.3.1] nonanes 1 (B-alkenyl-9-BBN) by Schwartz's reagent, H(Cl) $ZrCp_2$, proceeds smoothly in dichloromethane providing 1,1-bimetallics of boron and zirconium depicted as 2. (eq 1).

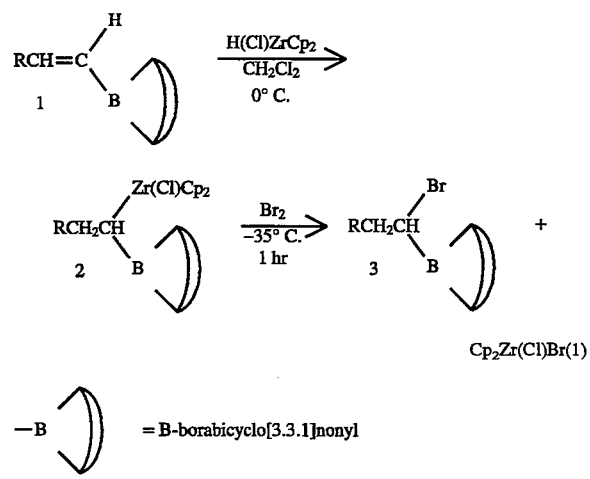

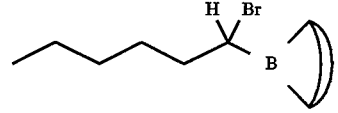

TABLE I

Preparation of α-Bromoboranes 3 by Bromination of 1,1-bimetallic compounds 2.

| Entry | R in Vinyl-9-BBM, 1 | Hydrozirconation Time, hr | Bromination Product, 3 | $^1$H NMR δ(ppm) of α-H(dd) | Yield[a] % |
|---|---|---|---|---|---|
| 1 | n-butyl | 1 | ![structure] | 4.13 | 97 |

TABLE I-continued

Preparation of α-Bromoboranes 3 by Bromination of 1,1-bimetallic compounds 2.

| Entry | R in Vinyl-9-BBM, 1 | Hydrozirconation Time, hr | Bromination Product, 3 | $^1$H NMR δ(ppm) of α-H(dd) | Yield[a] % |
|---|---|---|---|---|---|
| 2 | 3-chloropropyl | 1 | 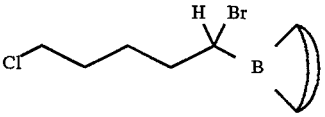 | 4.08 | 99 |
| 3 | 1-methylpropyl | 1.5 | 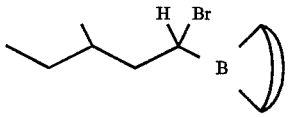 | 4.10 | 95 |
| 4 | 3-phenylpropyl | 1.5 | 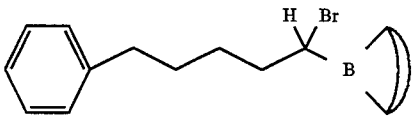 | 4.26 | 99 |
| 5 | cyclopentyl | 2 | 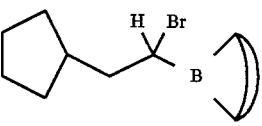 | 4.19 | 91 |
| 6 | t-butyl | 6 | 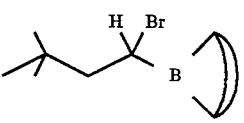 | 4.24 | 87 |
| 7 | phenyl | 6 | 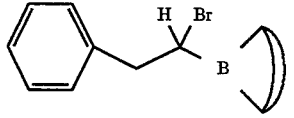 | 4.27 | 83 |

[a]crude yields, percent based on vinyl-9-BBN

Hydrozirconation was completed in dichloromethane and THF, and took 1 hour and 1.5 hours respectively at 0° C. for B-hexenyl-9-BBN. The study of solvent effect suggested that the electronic donor ability of a solvent favors the hydrozirconation process. This is different from the solvent effect observed in hydroboration where both diethyl ether and THF are suitable solvents.

We have also found that cyclic alkenylboronic esters, such as hexenyl-1,3,2-benzodioxaborole, ethylene glycol hexenylboronate and pinacol hexenylboronate, underwent partial hydrozirconation with one equivalent of Schwartz's reagent slowly. Alternatively, groups substituted on boron atom larger than 9-BBN also inhibited the rate of hydrozirconation. Thus diisopinocamphenyl hexenylborane and diisocaranyl hexenylborane were incompletely hydrozirconated at reduced rate. Obviously both electronic and steric factors greatly influence the course of hydrozirconation of B-alkenylboranes.

Addition of bromine in dichloromethane in situ at −35° C. resulted in the immediate discharge of color and yielded the slow formation of a white precipitate within 1 hour. The proton NMR of this isolated solid material is consistent with a zirconocene dihalide. After pumping of dichloromethane, extraction with hexanes from the reaction mixture provided the crude oily alpha-bromoboranes in high yields. The results are summarized in Table I. This reaction serves two purposes. It provides confirmation of the regioselectivity of the hydrozirconation step, and secondly generates the useful alpha-bromoboranes which can be converted into a multitude of organic products conveniently.

In addition to these results, the hydrozirconation of B-(-3-methoxy-1-propenyl)-9-BBN was carried out. By comparison with B-hexenyl-9-BBN, the required time for hydrozirconation was shortened by half. This interesting result hints that the coordination of zirconium in Schwartz's reagent to electronegative atom, oxygen, in the alkenylboranes speeds up the hydrozirconation.

The formed dimetallics and the product of bromination were complex.

In conclusion, 1,1-bimetalloalkanes of zirconium and boron were prepared by hydrozirconation of alkenylboranes with Schwartz's reagent, A selective cleavage of carbon-zirconium bond in these 1,1-bimetallics provides a convenient method to obtain alpha-bromoboranes.

EXAMPLE 2

This illustrates the typical procedure for preparation of a preferred catalyst for the polymerization of alpha-olefins, the catalyst being B-(-1-bromohexyl)-9-borabicyclo[3.3.1] nonane: All reactions and operations were under argon. To a stirred ice-cooled suspension of Schwartz's reagent (0.26 g, 1 mmol) in dry $CH_2Cl_2$ (1 ml) was added a solution of B-hexenyl-9-BBN (0.20 g, 1 mmol) in dry CH$_2$Cl$_2$ (1 ml). The cloudy suspension of the mixture become clear yellow solution in 1 hour at 0° C. (or 10 minutes at ambient temperature). After cooling to −35° C., bromine (0.16 g, 1 mmol) in 1 ml of CH$_2$Cl$_2$ was added dropwise. As the reaction mixture become colorless, a white precititate slowly formed. The resulting mixture was stirred 1 hour, and warmed to ambient temperature. After pumping off CH$_2$Cl$_2$, dry hexanes (2×2 ml) was added, and the reaction mixture extracted. Filtration of this hexanes solution and evaporation of the solvent from the filtrate afforded the crude product, alpha-bromohexyl-9-BBN, as a clear colorless oil (0.27 g, 97%). Organic products were identified by $^1$H NMR.

EXAMPLE 3

Recently, a series of boron-zirconium 1,1-dimetalloalkanes catalysts were synthesized and showed that they undergo selective cleavage of the carbon-zirconium bond with a series of electrophiles. There is described the preparation of 1,1-dimetalloalkenes based on boron and zirconiun, and in particular the synthesis, structure and reactivity of E-chlorobis(cyclopentadienyl)-[1-(4,4,5,5-tetramethyl-1,3,2-dioxaborolane-2-yl)-3,3-dimethylbutenyl]zirconium(IV) (2) which to our knowledge is the first example,of this new class of 1,1-dimetalloalkenes.

The synthesis of (2) is outlines in Scheme I. 2-(3,3-dimethylbutynyl)-4,4,5,5-tetramethyl-1,3,2-dioxaborolane (1) was prepared i high yield from the reaction of 1-lithio-3,3-dimethyl-1-butyne with 2-isopropoxy-4,4,5,5,-tetramethyl-1,3,2-dioxaborolane at −78°C., followed by treatment with ethereal hydrogen chloride. Hydrozirconation of (1) with 1.2 equiv of zirconocene hydrochloride afforded the desired product (81.5% isoloated yield) as a pale greenish crystalline solid.

Scheme I:

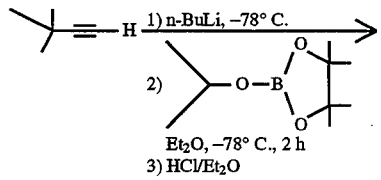

Scheme I:

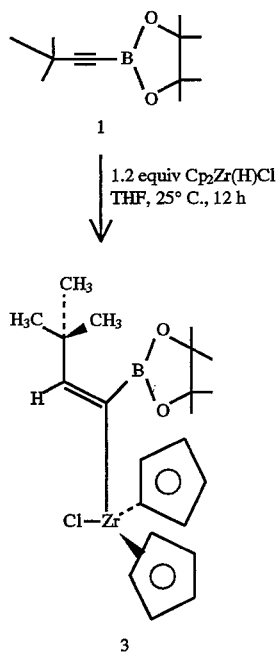

Vinylboronates generally are less reactive than vinylzirconates towards various electrophiles and therefore selective reaction of the latter should be possible. In fact, the reactive nature of compound 2 illustrated in Scheme II, in which 2 is reacted with several electrophilic reagents. We have found that the selective cleavage of the carbon-zirconium bond in 1,1-bimetalloalkenes by N-halosuccinimides provides (alpha-haloalkenyl)boronic esters in excellent chemical yields and with complete regioselectivity.

Scheme II:

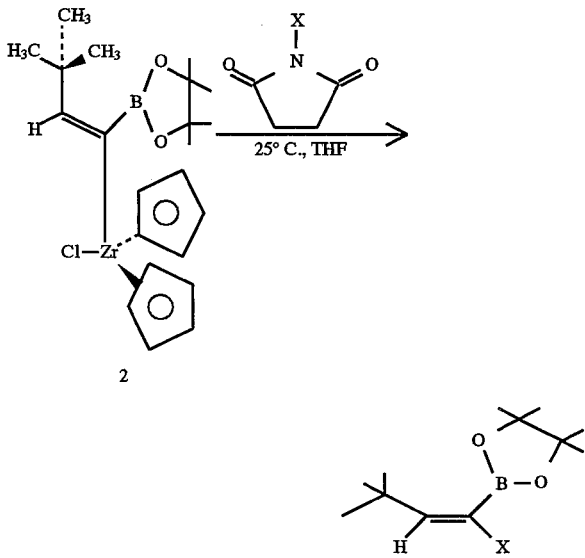

The X-ray analysis of 2 confirmed the configuration of the four-coordinated Zr complex, with two cyclopentadienyl rings, Cl and $Csp^2$ as four ligands Scheme 1). There are two molecules in the asymmetric part of the unit cell. Their configurations are identical, although the conformations differ in details. The mean distances form the central Zr ions to their ligands are as follows: to Cl—2520(1) Å, to Csp2—2.242(4) Å, to Cp1 and Cp2—2.22(1) Å (where Cp here means the center of the cyclopentadienyl ring). The dihedral angles between the planes defined by Cp1, Zr, Cp2 and Cl Zr, Csp2 are 90° and 89° for molecule A and B respectively. In both molecules the coordination spheres of zirconium form almost regular tetrahedrons. All Cp-rings are planar with ±0.01 Å. The tilt angle of 53° is the same in both molecules. However, Cp2 in molecule B shows statistical discorder with 60% and 40% occupancies for two observed orientations. The Cp-ring planes corresponding to these positions (C122,222,322,422,522 and C122A, 222A, 322A, 422A, 522A) make a dihedral angle of 2°. Both heterocyclic rings resemble the typical envelop conformations, with O-B-O-C in the plane and the remaining fifth C atom out of plane (0.46 Å and 0.42 Å, respectively). Although in molecule A—C3 bends toward metallocene moiety, while in molecule B—C15 points outwardly. Also, in molecule A the planar part of the heterocyclic ring makes almost a right angle (86°) with the plane defined by the cis substituted B—C=C—C olefin part of the complex, while in the molecule B the same dihedral angle is only 72°. These two observations are in contrast to the structures of D-mannitol tris(benzeneboronic)ester, two derivatives of streptovaricin C and a derivative of sarcophytol B, where in all cases the boron-containing rings are fairly planar and conjugated with the phenyl rings attached to boron. All bond distances and angles in both molecules agree within the experimental errors and show very good agreement with the values quoted for similar structures. The typical Π—Π interaction (distance of 3.5 Å) is observed between the fragments of Cp1-ring in molecules A (atoms C111 and C511) and Cp2-ring in symmetry related molecule 2 (atoms C522 & 522A, symmetry operation: 1-x, -y, 1-z). The differences in the conformations of the two independent molecules might be related to the packing of molecules in the crystal lattice.

Compound 2 was also unambiguously characterized by $^1H$, $^{11}B$ $^{13}C$ and $^{13}C$-$^1H$ heteronuclear chemical shift correlation NMR spectroscopy. The absence of CB(pp)-Π overlap in solution is indicated by the $^{11}B$ chemical shift ($\delta$=32.3) since this is in the same region ($\delta$=31.1) as the resonance for the corresponding boron-zirconium 1,1-dimetalloalkane, chlorobis(cyclopentadienyl)-[1-(4,4,5,5-tetramethyl-1,3,2-dioxaborolane-2-yl)-3,3-dimethylbutyl]zirconium (I Another interesting feature is the absence of the C-1 (carbon bearing B and Zr) resonance in the $^{13}C$ NMR of a $CDCl^3$ solution. This is attributed to Scalar $^{13}C$ spin—spin relaxation between (i) $^{13}C$ and $^{11}B$, (ii) $^{13}C$ and $^{10}B$, and (iii) $^{13}C$ and $^{91}Zr$. Metals with abundant isotopes that have spin quantum numbers exceeding ½ can broaden $^{13}C$ resonances for directly attached (and sometimes remote) carbons in organometallic compounds. In some cases where this scalar spin—spin relaxation occurs, $^{13}C$ signals may not be observed at all, such as for C-1 of 2 in $CDCl_3$. However, in $[D_8]$THF at 25° C., a resonance is visible for C-1 ($\delta$=187.8, W1/2ht—145 Hz) of 2. Upon lowering the temperature the linewidth of this resonance narrows (W1/2ht-8 Hz at -95° C.) but its shift is invariant. The magnitude of this shift is outside of the normal range (80 to 145 ppm) for substituted alkenes not bonded to a metal through the alkenyl carbons. Since little difference is found for the $^{13}C$ chemical shifts of non-metallated alkenyl carbons between E and Z isomers, it is instructive to compare these values in 2 ($\delta$(C-1)=187.8, $\delta$(C-2)=120.5, $[D_8]$THF) and E-[1-(4,4,5,5-tetramethyl-1,3, 2-dioxaborolane-2-yl )]-3,3-dimethylbutene ($\delta$(C-1)=112.1, $\delta$(C-2)=164, $CDCl_3$). Here, substitution of H by $ZrCp_2Cl$ has deshielded C-1 by 75.7 ppm and shielded C-2 by 41.5 ppm.

The details of the preparation of compounds 1, 2 and 3 are as follows:

1: Compound 1 was prepared according to reference 8. Yield: 11.85 g, 57 mmol, 89%; B.p. 79° C./5 mm Hg; $^1H$ NMR (400 MHz, $CDCl_3$, 25° C., TMS): $\delta$=1.25 (s, 12H, pinacol), $\delta$=1.22 (s, 9H, $C(CH_3)_3$); $^{11}B$ NMR (128.3 MHz, $CDCl_3$, 25° C., relative to $BF_3$-$Et_2O$): $\delta$=23.4 (W1/2ht=196 Hz).

2: A suspension of $Cp_2ZrCl(H)$ (0.51 g, 1.29 mmol) in dry THF (3.8 ml) was stirred at ambient temperature under an atmosphere of argon. 3.3 ml of 0.5 M solution of 2-(3,3-dimethylbutynyl)-4,4,5,5-tetramethyl-1,3,2 -dioxaborolane 1 (1.64 mmol) in THF was then added. The reaction mixture was stirred overnight, and became a clear green-yellow solution. After pumping off the THF, hexanes (3×10 ml) was added to extract the reaction mixture. Concentration of the solution and crystallization at -20° C. afforded stable pale green crystals. Yield: 0.55g, 1.17 mmol, 81.5%.; $^1H$ NMR (400 MHz $CDCl_3$, 25° C., TMS): $\delta$=6.53 (s,1H, C=CH), 6.08 (s, 10H, Cp), 1.35 (s,12H, pinacol), 1 (s, 9H, $C(CH_3)_3$); $^{13}C$ NMR (100.6 MGz, $CDCl_3$, 25° C., TMS): $\delta$=120.5 (C=CH), 112.2 (Cp), 82.9 ($OC(CH_3)_2$), 36.5 ($C(CH_3)_3$), 29.5 ($C(CH_3)_3$), 25.0 ($OC(CH_3)2$). In $CDCl_3$ solution at 25° C., the C-1 (C bearing B and Zr) resonance was not visible. At 25° C. in $[D_8]$ THF, this resonance was observed at $\delta$=1.87.8 (W1/2ht=145 Hz). Upon lowering the temperature the shift was invariant but the linewidth decreased (-60° C., W1/2ht=14 Hz; -95° C., W1/2h=8 Hz); $^{11}B$ (128.3 MHz, $CDCl_3$, 25° C., relative to $BF_3$-$Et_2O$): $\delta$=32.3 (W1/2ht=518 Hz); CHN analysis: % C=56.68 (calculated=56.65), % H=7.09 (calculated=6.93).

EXAMPLE 4

This example illustrates the preparation of a stable 1,1-bidentate Lewis Acid based on boron and zirconium.

The synthesis of 2 is outlined in Scheme 1. Treatment of hex-1-yne with $HBBr_2.Me_2S$ followed by conversion of the dibromoboronic ester to the corresponding alkenylboronic acid and esterification with propane-1,3-diol provided alkenylboronic ester 1. Hydrozirconation of 1 with 3 equiv. of Schwartz's reagent, $[Zr(Cp)_2(Cl)H]$, afforded the desired product 2 (86% isoldated yield), as a yellow crystalline solid. Compound 2 appears to be stable to dry air in the solid state, but softens and decomposes at 96° C.

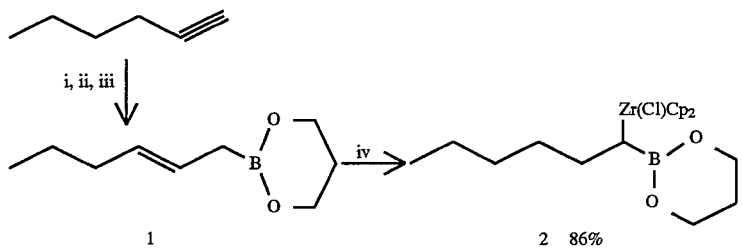

Scheme 1 Reagent and conditions: i, HBR$_2$.Me$_2$S: ii, H$_2$O$_2$, NaOH: iii, HO(CH$_2$)$_3$OH: iv, [Zr(Cp)$_2$(Cl)H] (3 equiv.), CH$_2$Cl$_2$, 0° C. (Cp = C$_5$H$_5$)

The X-ray analysis of 2 has proven it to be a complex of four-coordinated Zr With two cyclopentadienyl rings, Cl and the aliphatic C(1) as ligands. There are no intra- or intermolecular interactions between Zr and boron or oxygen atoms. The coordination sphere of zirconium approximates a tetrahedron with a dihedral angle between Cl—Zr—C(1) and Cp(1)-ZR-Cp(2)§ planes being 88.4(1)°; the dihedral angle between the planes of the cyclopentadienyl rings is 53.0(2)°, both cyclopentadienyl moieties are planar and twisted by 17.7(4)° from the fully eclipsed conformation. The distances of Zr to Cp(1) and Cp(2) are 2.205(1) and 2.208(1) Å respectively. The bond length Zr—Cl is 2.459(1) Å and Zr—C(1) is 2.306(4) Å. The conformation of the six-membered heterocyclic ring resembles an envelope with C(9) being 0.619(6) Å out of the plane of the five other atoms.

As indicated in the above working Examples, suitable boron-zirconium 1,1-bimetallic compounds have been made and used as polymerization catalysts, the compounds being of the following general structure:

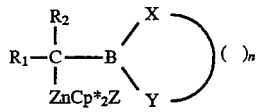

R$_1$ = H, alkyl, aryl
R$_2$ = H, alkyl, aryl
X = O, N—H, N—R, PR$_3$
Y = O, N—H, N—R, PR$_3$
n = 1,2,3,4 . . . with various substituents
Z = Cl, Br, I, F.
Cp*$_2$ = cyclopentadienyl and any related cyclopentadienyl lignad.

The boron-zirconium dimetallic compounds of the invention are useful as Lewis acid catalysts for providing highly effective and superior methods for the polymerization of alpha-olefins.

EXAMPLES 5

An optically active dioxaborolane compound, chlorobis(cyclopentadienyl)-[1,3,2-dioxaborinane-1-yl]hexyl zirconium (IV) was prepared.

The compound was used as a catalyst to polymerize styrene, an alpha-olefin. The catalyst amount was 0.2 mole per mole of styrene. The polymerization conditions are 60° C. for 8 hours.

Compound 2 catalyses the polymerization of styrene, as demonstrated by polymerization in solution. The resulting polymers had weight-average molecular masses in the range 75,000–110,000 with polydispersities of 1.8–2.1. GPC traces are unimodal with well-formed symmetric peaks. No co-catalyst was required to obtain these samples.

Suitable polymerization conditions, as indicated above, is a temperature of generally about 25° C. to 100° C. (preferably about 20° C. to 60° C.) for about 4 to 24 hours (preferably 6 to 12 hours). Generally about 0.01 to 1 mole and preferably about 0.0 to 0.4 mole of catalyst is used per mole of alpha-olefin. Suitable alpha-olefins are ethylene, propylene, butylene and pentylene.

What is claimed is:

1. A method of polymerizing olefin or styrene monomers comprising reacting said monomer monomer in the presence of a polymerization catalyst that is a bimetallic compound having the structure:

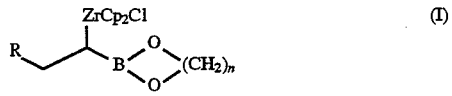

n = 3

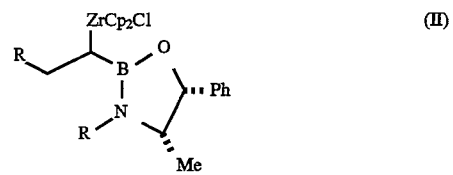

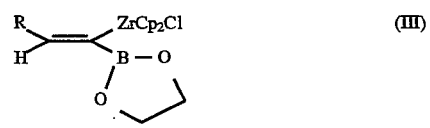

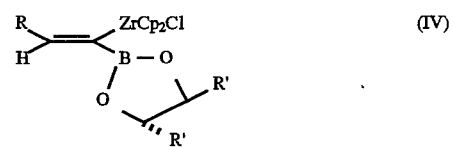

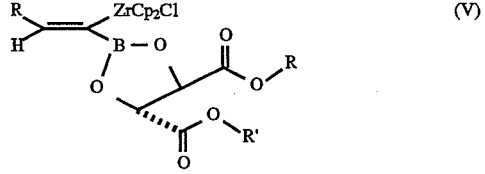

wherein in structure III, R is t-butyl;
wherein in structures I, II, IV and V, R is an organic radical having 2–20 carbon atoms that is aliphatic, aromatic, heteroaromatic or cyclic or their halogenated substituted derivatives and R' is an alkyl group of 1–8 carbon atoms.

2. A method as defined in claim 1 in which the alpha-olefin has 2 to 8 carbon atoms.

3. A method as defined in claim 1 which the olefin is ethylene.

4. A method as defined in claim 1 which the olefin is propylene.

5. A method as defined in claim 1 where the olefin is butylene.

6. A method as defined in claim 1 in which the monomer is styrene.

7. A method as defined in claim 1 in which the alpha-olefin is pentylene.

8. A method as defined in claim 1 in which the polymerizing is done at about 25° to 100° C. at about 1 to 150 atmospheres of pressure for about 1 hour to 24 hours.

9. A method as defined in claim 1 in which the catalyst is used in amount of 0.01 to 1.0 mole per mole of alpha-olefin monomer.

10. A method as defined in claim 1 in which the castalyst is chlorobis (cyclopentadienyl) [1-(1,3,2-dioxaborinane-2-yl)hexyl] zirconium (IV).

11. A method of polymerizing an olefin comprising polymerizing an alpha-olefin or styrene monomers in the presence of a Zr/B bimetallic compound having the following formula:

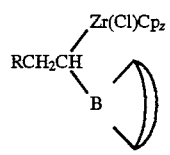

where R is an alkyl, except tert-butyl, alkenyl, cycloalkyl, phenyl, alkyl-phenyl or their chloro- or bromo-substituted derivatives; where

is B-borabicyclo nonyl, and where $Cp_2$ is bis (cyclopentadienyl).

12. A method as defined in claim 11 in which the olefin is ethylene.

13. A method as defined in claim 11 in which the alpha-olefin is 1,3-butadiene.

* * * * *